United States Patent
Hull et al.

[11] Patent Number: 5,308,181
[45] Date of Patent: May 3, 1994

[54] ERGONOMICALLY DESIGNED LIQUID DISPENSER AND APPLICATOR

[76] Inventors: Harold L. Hull, 401 Canyon Way #43, Sparks, Nev. 89434; Patty C. Marshall, P.O. Box Drawer F, Silver City, Nev. 89428

[21] Appl. No.: 958,721

[22] Filed: Oct. 9, 1992

[51] Int. Cl.⁵ .............................................. B05C 17/00
[52] U.S. Cl. .................................. 401/206; 401/280; 401/8; 222/561
[58] Field of Search ............... 401/204, 205, 206, 207, 401/280, 291, 8, 23; 222/561, 482, 485, 511

[56] References Cited

U.S. PATENT DOCUMENTS

| | | | |
|---|---|---|---|
| 792,278 | 6/1905 | McCarthy | 401/205 |
| 1,524,662 | 2/1925 | Layman | 222/561 |
| 1,676,601 | 7/1928 | Cavanaugh | 401/280 X |
| 1,690,022 | 10/1928 | Langhaas | 401/280 X |
| 3,597,097 | 8/1971 | Kellis | 401/280 X |

FOREIGN PATENT DOCUMENTS 484436 7/1952 Canada .................... 401/280

*Primary Examiner*—Danton D. DeMille

[57] ABSTRACT

A replaceable liquid application implement is attached to a hand-manipulated fluid reservoir and a thumb-activated plate is disposed between the application implement and the reservoir for selectively controlling the flow of fluid.

8 Claims, 2 Drawing Sheets

ERGONOMICALLY DESIGNED LIQUID DISPENSER AND APPLICATOR

FIELD OF THE INVENTION

This invention relates to liquid dispensers and more particularly to a hand-manipulated dispenser which dispenses liquid through a sponge applicator for use such as in livestock industry.

BACKGROUND OF THE INVENTION

In the past a number of attempts have been made to teach a device which dispenses liquid on demand such as the oil applicator of U.S. Pat. No. 2,100,855 which discloses a hollow shell having an open bottom and a rotatable sponge with a perforated disk in between which must be rotated to align the holes to dispense liquid, however this device while being functional in itself requires the use of both hands and is not ergonomically designed to be operated by one hand. Also, in actual use the disk will leak when out of register as it depends on a friction fit.

U.S. Pat. No. 3,698,824 also teaches an apparatus for washing vehicles, windows and other surfaces and carries its own supply of fluid which also teaches a disk as a valve means which must be moved into and out of register with its supply and the applicator which is rotational in design and again depends on a friction fit and is not designed in a hand-friendly, ergonomic manner.

Neither of the above mentioned references nor any prior art found by the applicants, are designed for use with livestock which the present invention addresses as the present invention teaches a hand-friendly, ergonomic dispenser which, although it may be used in other applications, such as washing vehicles, windows, etc., has special features which make it ideal for use with livestock.

SUMMARY

It is therefore a primary object to provide a liquid dispenser for use with livestock.

Another object is to provide a dispenser which is usable with one hand while the other hand may be used to control the animal.

Still another object is to provide a dispenser which, when not in use, has a cover or basin which covers the sponge or applicator.

Yet another object is to provide a dispenser which can be used by either hand and is ergonomically designed to fit either hand.

Another important object is to provide a thumb-actuated mechanism to release liquid on demand.

Still another object is to provide a tensioned wedge-shaped plate which has a first and second position, which provides a positive closing surface when in its first position and an open surface when in its second position.

Another important object is to provide easy replacement of the sponge by means of screw-driver slots to release a bottom plate from a liquid container.

Still another object is to provide a flexible cover for the thumb-actuated mechanism for releasing the liquid on demand.

Other objects and advantages will become apparent when taken into consideration with the following drawings and specifications.

DETAILED DESCRIPTION OF THE DRAWINGS

Figure 1:
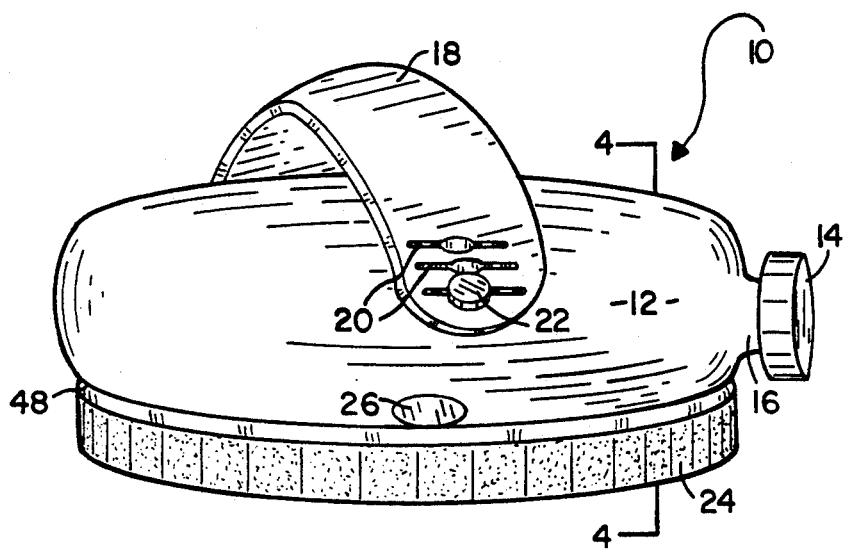
FIG. 1, is a perspective view of the dispenser.
Figure 2:
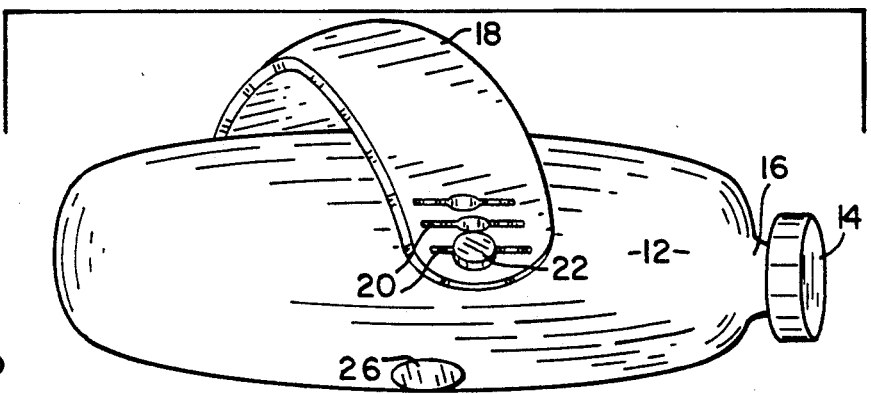
FIG. 2, is an exploded perspective view of the dispenser.

Referring now in detail to the drawings wherein like characters refer to like elements throughout the various drawings, 10 is an overview of the assembled apparatus with 12 being a container such as a plastic bottle with 14 being a filling cap suitably affixed to spout 16 while 18 is a hand strap made of a suitable material such as leather with multiple adjustment button holes 20 which cooperate with button 22 while 24 is an applicator made of a material such as sponge rubber, or a brush (not shown) or any other desirable applicator while 26 is a cover made of a suitable flexible material such as rubber which is suitably affixed to bottle 12 to provide a liquid tight seal and covers the thumb-slide 28 as shown in FIG. 2.

Figure 5:
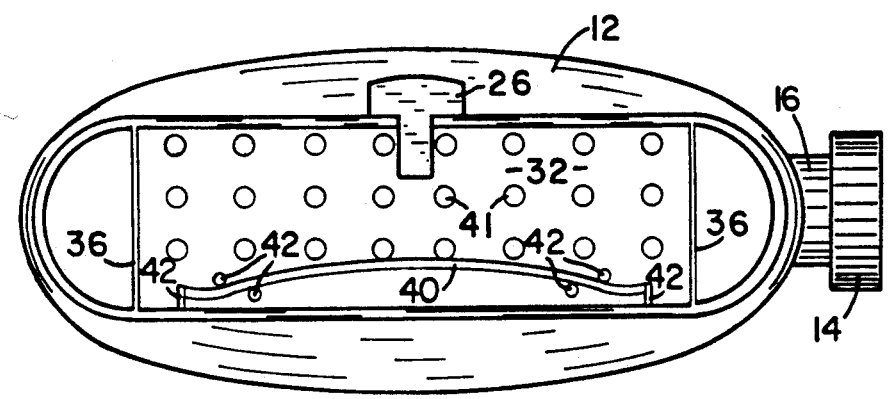
FIG. 5, is a bottom view of the liquid supply vessel.
Figure 6:
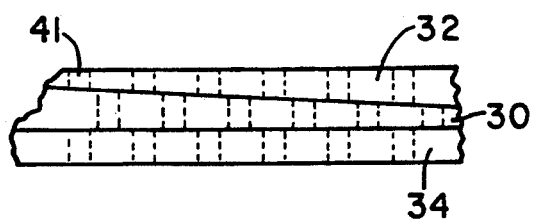
FIG. 6, is a plan view, drawn to a different scale, of the sliding action of the center plate in a first position.
Figure 7:
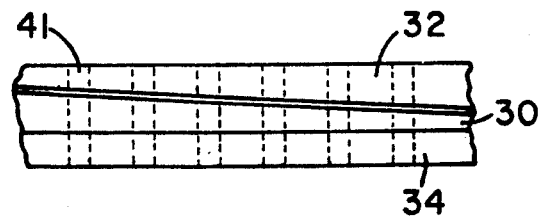
FIG. 7, is a plan view, drawn to a different scale, of the sliding action of the center plate in a second position.

Thumb-slide 28 is a part of the wedge shaped, substantially rectangular center plate 30 as shown in FIG. 2, which is mounted in between the flat bottom 32 of bottle 12 as shown in FIG. 5 and the supporting plate 34 of applicator 24 and is kept in between guides 36 of flat bottom 32 and guides 38 as shown in FIG. 2, respectively, allowing center plate 30 to move in a lateral plane to a first and second position.

Figure 3:
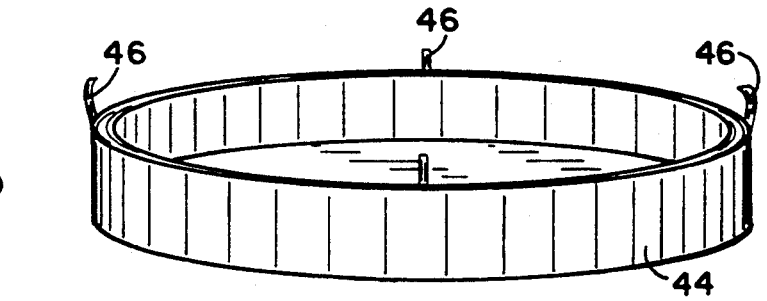
FIG. 3, is a perspective view of a sponge cover.
Figure 4:
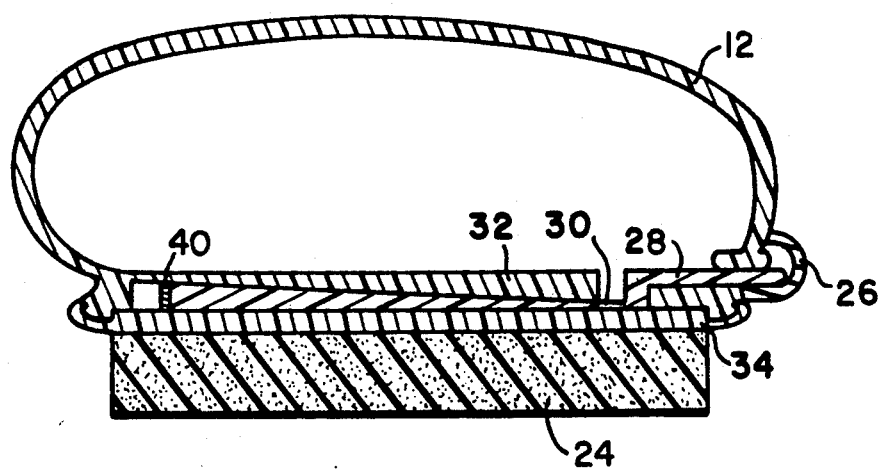
FIG. 4, is a cross section, drawn to a different scale, taken at 4—4 of FIG. 1.

Spring 40, the flat bottom 32, the center plate 30 and the support plate 34 have a plurality of equally spaced arranged openings 41, which when center plate 30 is in its normally closed, first position, are out of register thus blocking the passage of liquid from the interior of bottle 12 to the applicator 24, however, when the center plate 30 is in its second position, the equally spaced openings 41 are in alignment thus allowing liquid to escape to the applicator 24. Also, the center plate is urged and tensioned outward in its first position by flat spring 40, spring 40 being retained in position by multiple bosses 42. As shown in FIG. 2, 50 are screw-driver slots for easy removal or replacement of the sponge 24. In FIG. 3, 44 is a sponge cover having retaining clips 46 which cooperate with the rounded bottom edge 48 of bottle 12.

It will also be noted that the center plate 30, being wedge-shaped, provides a positive seal between the flat bottom 32 and the support plate 34 thus providing double protection against leakage.

It will now be seen that we have provided a liquid dispenser for use with livestock.

It will also be seen that we have provided a dispenser which is usable with one hand while the other hand may be used to control the animal.

It will further be seen that we have provided a dispenser which when not in use, has a cover or basin which covers the sponge or applicator.

We have also provided a dispenser which can be used by either hand and which is ergonomically designed to fit either hand.

It will now be seen that we have provided a dispenser which includes a thumb-actuated mechanism to release liquid on demand.

It will also be seen that we have provided a dispenser which includes a tensioned wedged-shaped plate which has a first and second position, which provides a positive closing surface when in its first position and an open surface when in its second position.

We have also provided easy replacement of the sponge by means of screw-driver slots to release a bottom plate from a liquid container.

It will also be seen that we have provided a flexible cover for the thumb-actuated mechanism for releasing the liquid on demand.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by letters patent is;

1. A liquid applicator adapted to be used with livestock comprising: a reservoir for fluid, said reservoir having filling means, an application implement in the form of a sponge, said reservoir having at least one flat surface on one of its sides, said application implement having a first mounting plate, valve means disposed between said flat surface of said reservoir and said first mounting plate of said application implement for selectively controlling the passage of fluid from the reservoir to the sponge and comprising a substantially rectangular second plate, said second plate being wedge shaped across its width, said second plate being slidably mounted between said flat surface of said reservoir and said first mounting plate, said flat surface of said reservoir, said first mounting plate and said second plate having a plurality of openings therein for selective registration from a first closed position to a second open position, said second plate being spring loaded to be normally closed in its said first position, means to manually urge said second plate into its said second position, means to removably affix said first mounting plate to said flat surface of said reservoir, whereby, when said valve means is in its said first position said openings are out of registration and when said valve means is in its said second position, said openings are in registration and said fluid may pass thru said openings into said application implement.

2. The liquid applicator of claim 1 including means to hold said liquid applicator to a hand.

3. The liquid applicator of claim 2 in which said means to hold said liquid applicator to a hand is an adjustable strap.

4. The liquid applicator of claim 1 including a cover for said applicator implement.

5. The liquid applicator of claim 4 in which said cover is a pan, said pan being of a size and shape to cover said liquid applicator, said pan having means to be removably affix to said reservoir.

6. The liquid applicator of claim 1 in which said means to manually urge said second plate into its said second position is an extension on said second plate, said extension protruding through a suitable opening in said reservoir, said extension and said opening being covered by a flexible cup, said cup being suitably affixed to said reservoir to prevent leakage of said fluid.

7. The liquid applicator of claim 1 in which said reservoir is ergonomically designed to allow the thumb of a hand to be in close proximity to said manual means to urge said second plate into its said second position.

8. The liquid applicator of claim 1 in which said means to removably affix said first mounting plate to said flat surface of said reservoir is multiple screwdriver slots to enable a screwdriver to be inserted to pry apart said first mounting plate from said mounting plate.

* * * * *